(12) United States Patent
Olson et al.

(10) Patent No.: US 10,547,403 B2
(45) Date of Patent: Jan. 28, 2020

(54) OPTICAL NETWORK LASER AUTO-TUNING METHODS AND SYSTEMS

(71) Applicant: Infinera Corp., Annapolis Junction, MD (US)

(72) Inventors: Magnus Olson, Järfälla (SE); Einar In de Betou, Vällingby (SE)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 16/208,280

(22) Filed: Dec. 3, 2018

(65) Prior Publication Data

US 2019/0103933 A1    Apr. 4, 2019

Related U.S. Application Data

(63) Continuation of application No. 15/687,161, filed on Aug. 25, 2017, now Pat. No. 10,148,382.

(60) Provisional application No. 62/515,422, filed on Jun. 5, 2017.

(51) Int. Cl.
| | |
|---|---|
| *H04J 14/02* | (2006.01) |
| *H04B 10/50* | (2013.01) |
| *H04B 10/25* | (2013.01) |
| *H04B 10/40* | (2013.01) |

(52) U.S. Cl.
CPC ......... *H04J 14/02* (2013.01); *H04B 10/25* (2013.01); *H04B 10/40* (2013.01); *H04B 10/503* (2013.01)

(58) Field of Classification Search
CPC .... H04J 14/02; H04J 14/0257; H04J 14/0282; H04B 10/40; H04B 10/503; H04B 10/25

USPC .......................................................... 398/79
See application file for complete search history.

(56) References Cited

U.S. PATENT DOCUMENTS

| | | | | |
|---|---|---|---|---|
| 6,469,814 | B1 * | 10/2002 | Park ................. | H04B 10/077 398/79 |
| 2011/0205521 | A1 * | 8/2011 | Mimeault .......... | G01S 7/4814 356/4.01 |
| 2012/0224851 | A1 | 9/2012 | Takara | |
| 2013/0259473 | A1 * | 10/2013 | Fujii ................... | H04J 14/02 14/2 |
| 2014/0010543 | A1 * | 1/2014 | Lee ................... | H04B 10/61 398/79 |
| 2014/0079401 | A1 | 3/2014 | Lee | |
| 2017/0171647 | A1 * | 6/2017 | Gao ................... | H04B 10/25 |

* cited by examiner

*Primary Examiner* — Don N Vo

(74) *Attorney, Agent, or Firm* — David L. Soltz

(57) ABSTRACT

Methods and systems are disclosed including a system comprising a first node, having a first transceiver comprising a first receiver and a first transmitter, comprising a tunable laser, configured to transmit a first optical signal on a first channel and to transmit a second optical signal on a second channel if the first receiver does not detect a third optical signal; a second node having a second transceiver comprising a second receiver and a second transmitter configured to transmit the third optical signal on the first channel if the second receiver detects the second optical signal; and a filter having ports configured to a particular bandwidth and to suppress the first optical signal if the first optical signal is not within the particular bandwidth of the port, and to transmit the second optical signal to the second node if the second optical signal is within the particular bandwidth.

11 Claims, 14 Drawing Sheets

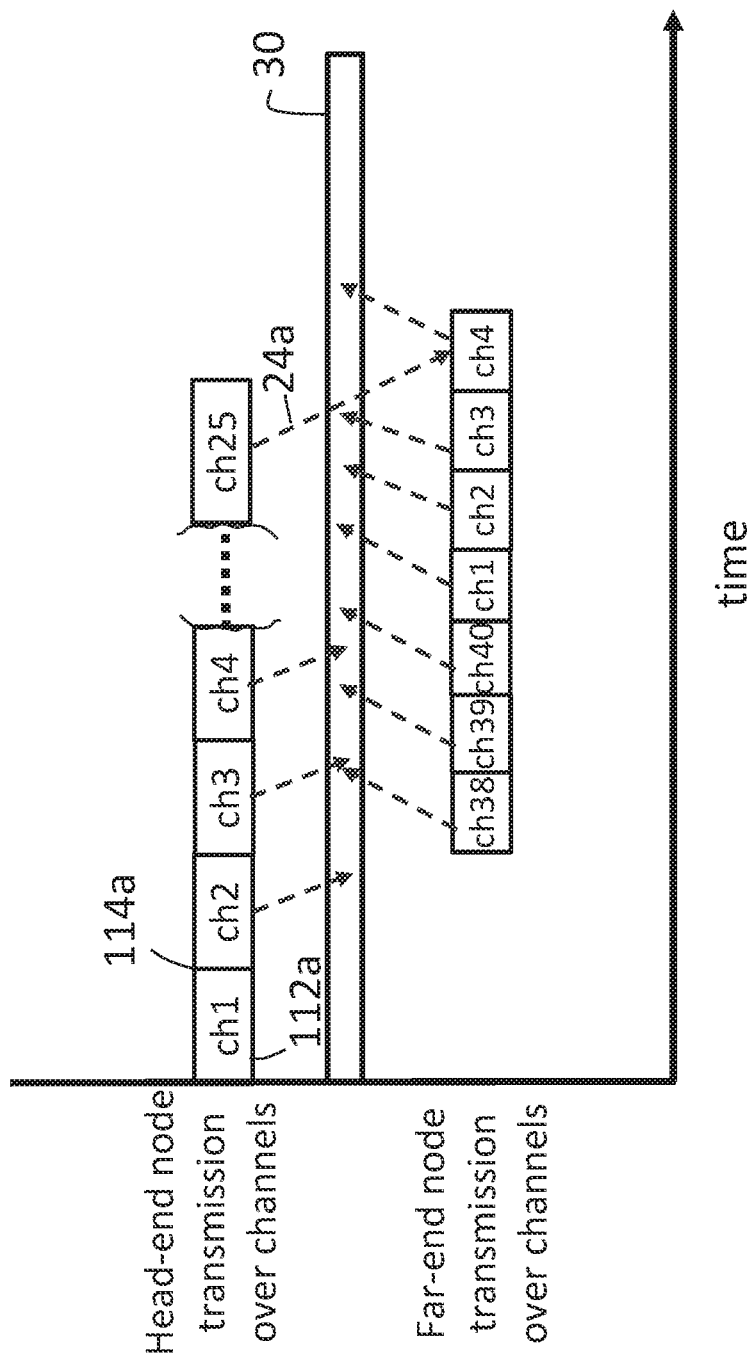

OPTICAL NETWORK LASER AUTO-TUNING METHODS AND SYSTEMS

INCORPORATION BY REFERENCE

The present application is a continuation of Application ser. No. 15/687,161, filed Aug. 25,2017which claims the benefit of U.S. Provisional Application No. 62/515,422, filed Jun. 5, 2017, the entire contents of which are hereby expressly incorporated herein by reference.

FIELD OF THE DISCLOSURE

The disclosure generally relates to methods and systems for auto-tuning lasers in optical communication networks. More particularly the disclosure relates to automatically determining and tuning one or more laser to the channel to be used for communication across a wave-division multiplexing (WDM) optical communication network.

BACKGROUND

An Optical Network (ON) is comprised of a plurality of optical nodes linked together to form a network. Lightpaths are optical connections carried over a wavelength, end to end, from a source node (also known as a head-end node) to a destination node (also known as a far-end node) in the optical network (ON). The ON includes a data layer, a digital layer, and an optical layer. The optical layer contains multiple sub-layers. ON structure, architecture, and modeling are further described in the International Telecommunication Union recommendations, including ITU-T G.709, ITU-T G.872, and ITU-T G.805, which are well known in the art. In general, the ON is a combination of the benefits of the digital connectivity layer, may it be e.g. SONET/SDH or Ethernet based technology, and dense wavelength-division multiplexing (DWDM) technology (optics, Layer 0, the Physical Layer).

Wave-division multiplexing (WDM) is a type of multiplexing in which two or more optical carrier signals are multiplexed onto a single optical fiber by using different wavelengths (that is, colors) of laser light.

Different WDM systems may be referred to as normal wave-division multiplexing (WDM), coarse wave-division multiplexing (CWDM) and dense wave-division multiplexing (DWDM), depending on their wavelength patterns. ITU-T has standardized spectral grids for course WDM (CWDM) in Recommendation G.694.1 and dense WDM (DWDM) in Recommendation G.694.2.

To successfully communicate over the Optical Network (ON), the physical interfaces of the end nodes need to follow certain criteria. ITU-T has defined physical layer interfaces for multivendor interoperable systems in G.959.1. The ITU-T standard G.695 defines physical layer interfaces for multivendor interoperable CWDM systems. The ITU-T series of standards G.698.x defines physical layer interfaces for multivendor interoperable DWDM systems. More specifically, G.698.3 defines a system where the transmitters use a seed signal to lock to the desired transmission wavelength. This standard currently only defines applications for 1.25 Gb/s bit rates.

Tunable DWDM laser transmitter technology is widely used in the metro/core part of optical communication networks and is regarded as a good long term transmitter technology in the access portion of networks. Tunable lasers may reduce the inventory of transceivers to a single type of transceiver (rather than a plurality of transceivers that are pre-set to a single wavelength) and provide excellent optical transmission properties. Today, tunable dense wave-division multiplexing small form-factor pluggable (DWDM SFP+) optical modules represent transceiver technology available in the market for 10 Gb/s and higher data rates applications.

However, one problem with the use of tunable transmitters in the access part of the network is that they need to be configured to transmit at the correct wavelength (channel) corresponding to the wavelength port of the wave-division multiplexing (WDM) filter to which they are connected. Typically, the equipment that sits in the link end of the network that is closest to the end customer (i.e., the far-end side) is unaware of what wavelength on which to transmit. This could also apply to the equipment that sits closest to the core of the network (i.e., the head end side).

The term "colorless" may be used to describe the ability to adapt the wavelength that is transmitted to the filter port on the WDM filter to which an optical networking unit (ONU) is connected. Such colorless behavior could be implemented by using a reflective source. One example is the ASE injected Fabry-Perot semiconductor laser diode. This technology was first commercialized by Novera Optics in the beginning of the 2000's. Transmode Systems AB (now Infinera) also commercialized a system based on this technology (iWDM-PON released in 2012). However, this technology may be technically challenging and costly to scale to 10 Gb/s and higher bit rates due to the intrinsic relative intensity noise (RIN) degradation of the optical signal as the bandwidth of the semiconductor laser device is increased. By using tunable lasers, 10 Gb/s and higher bit rates is technically feasible, but these sources lack the colorless ability that comes with the ASE injected Fabry-Perot lasers.

Monolithically integrated tunable lasers are widely used in the core and metro part of the networks, but have been used to a very limited extent in the access networks. A technical problem with optical modules based on tunable laser technology is the lack of ability to auto-tune the laser's wavelength. One proposed solution to this problem uses pilot tones to assist tuning. For example two technical papers describe a method for auto-tuning using pilot tones (they highlight different aspects of the same method): M. Roppelt, F. Pohl, K. Grobe, M. Eiselt, J.-P. Elbers, "Tuning Methods for Uncooled Low-Cost Tunable Lasers in WDM-PON", in Proc. OFC, Paper NTuB.1, 2011; and M. Roppelt, M. Eiselt, K. Grobe, J.-P. Elbers, "Tuning of an SG-Y branch laser for WDM-PON", in Proc. OFC, Paper OW1B.4, 2012. However, a problem with such an approach is that it adds hardware cost and complexity and negatively impacts the performance of the optical signal.

What is needed is an automatic tuning mechanism of the tunable lasers in the system, since this would greatly reduce the operational complexity and cost for the operator. The systems and methods disclosed herein solve the problem at a low cost and complexity and avoid penalty to the optical signal.

SUMMARY

Methods and systems are disclosed. The problem of the lack of ability to auto-tune the wavelength of tunable laser technology is addressed through an automatic tuning mechanism for tunable lasers in a WDM system that greatly reduces the operational complexity of such system. More specifically, the problem is addressed with a system with a wavelength tunable transmitter device communicating with a receiver device, interconnected via a wavelength division multiplexing (WDM) fiber optic network which allows communication between two end points to take place at a specific wavelength (or set of wavelengths) and not other wavelengths, finding a correct wavelength for communication via the following auto-tuning method: the transmitting device transmits at different wavelengths, the WDM network suppresses all wavelengths except the correct one, and the receiving device provides feedback to the transmitting device when the transmitted signal has been received via the WDM network.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 6A is another timing diagram of an exemplary embodiment of components of a system in accordance with the present disclosure.

DETAILED DESCRIPTION

Figure 1A:
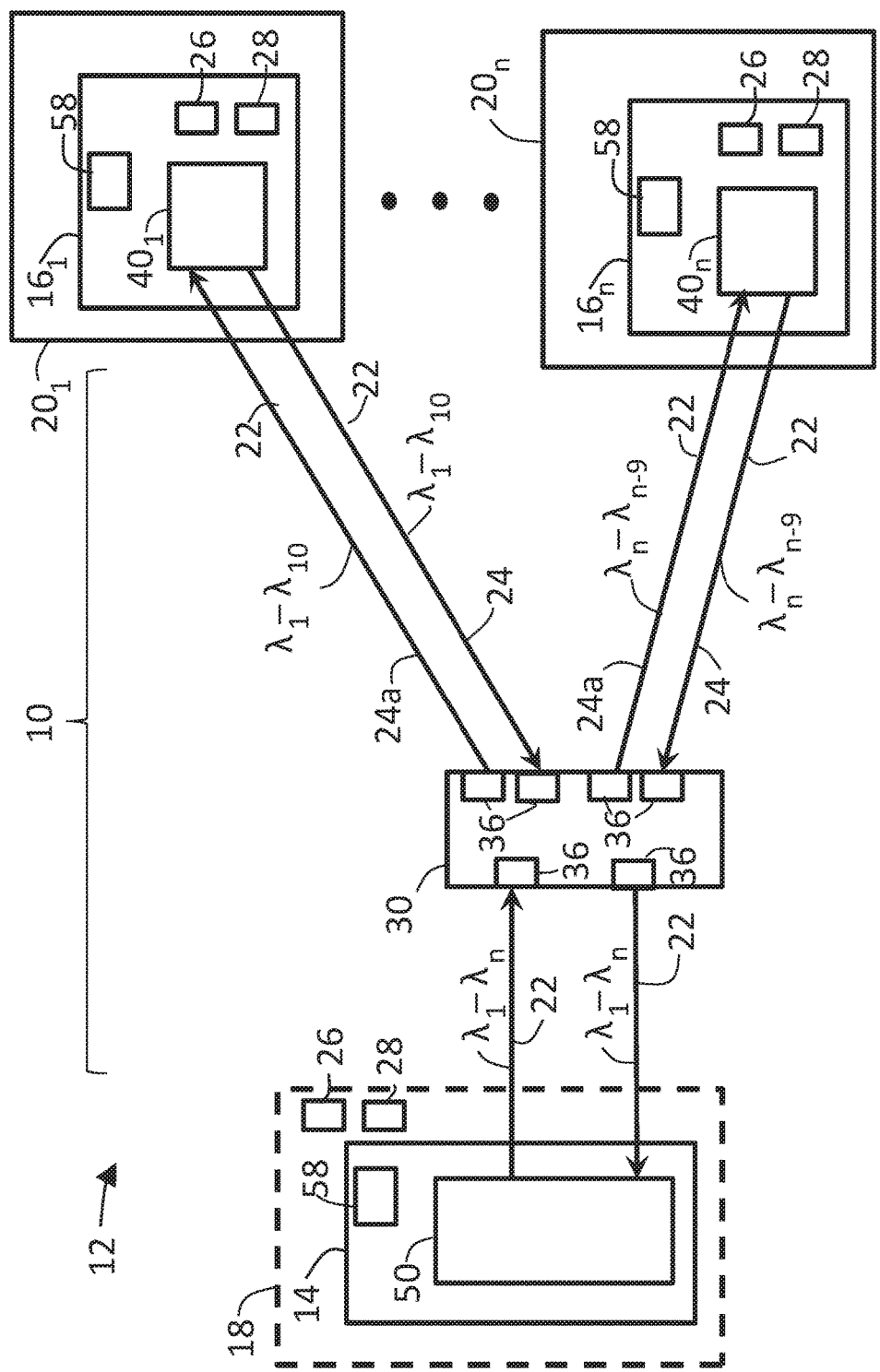
FIG. 1A is a schematic diagram of an exemplary embodiment of a system in accordance with the present disclosure.

The following detailed description refers to the accompanying drawings. The same reference numbers in different drawings may identify the same or similar elements.

The mechanisms proposed in this disclosure circumvent the problems described above. The methods and systems described herein are not limited to certain higher layer protocols. On the contrary, one of the benefits of the described methods and systems are that they are agnostic as to whether the protocol used is Eth, Sonet/SDH, or other protocols in other layers.

The present disclosure describes systems and methods including a system comprising a first node, comprising a first transceiver, comprising a first receiver; and a first transmitter, comprising a tunable laser, configured to transmit a first optical signal on a first channel and to transmit a second optical signal on a second channel if the first receiver does not detect a third optical signal; a second node, comprising a second transceiver, comprising a second receiver; and a second transmitter configured to transmit the third optical signal on the first channel if the second receiver detects the second optical signal; and a filter connected to the first node and the second node with one or more optical fibers, the filter having a plurality of ports, each port configured to a particular bandwidth and configured to suppress the first optical signal if the first optical signal detected in the port is not within the particular bandwidth of the port, and to transmit the second optical signal to the second node if the second optical signal detected in the port is within the particular bandwidth.

Definitions

If used throughout the description and the drawings, the following short terms have the following meanings unless otherwise stated:

The term "a bandwidth" is used herein to mean a range of optical wavelength frequencies.

The term "channel" is used herein to mean a specified portion of the optical spectrum which carries a specific optical signal wavelength.

WDM stands for wave-division multiplexing, which is a type of multiplexing in which two or more optical carrier signals are multiplexed onto a single optical fiber by using different wavelengths (that is, colors) of laser light. Different WDM systems may be referred to as normal wave-division multiplexing (WDM), coarse wave-division multiplexing (CWDM) and dense wave-division multiplexing (DWDM), depending on their wavelength patterns. The ITU-T standard G.692, "Optical interfaces for multichannel systems with optical amplifiers", discusses WDM systems and plans.

FTTx stands for Fiber-To-The x, where "x" may denote, for example, Home, Curb, Cabinet, or Basement. PON stands for Passive Optical Network. CATV/MSO Triple-Play system stands for Community Access Television (or Cable Television)/Multi-System Operator system offering voice, video, and data services.

LOS stands for Loss Of Signal, which typically refers to the condition where the signal strength drops below a predetermined threshold and so is not detected by the transceiver.

Rx stands for Receiver, which typically refers to optical channel receivers, but can also refer to circuit receivers.

SD-WAN-MEF stands for Software Defined Wide-Area Network- Metro Ethernet Forum.

Tx stands for Transmitter, which typically refers to optical channel transmitters, but can also refer to circuit transmitters.

Tx=OFF stands for a condition where a transmitter is off, that is, not transmitting optical signals.

Description

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Further, the phrase "based on" is intended to mean "based, at least in part, on" unless explicitly stated otherwise.

Also, certain portions of the implementations have been described as "components" or "circuitry" that perform one or more functions. The term "component" or "circuitry" may include hardware, such as a processor, an application specific integrated circuit (ASIC), or a field programmable gate array (FPGA), or a combination of hardware and software. Software includes one or more computer executable instructions that when executed on one or more component cause the component or circuitry to perform a specified function. It should be understood that the algorithms described herein are stored on one or more non-transient memory. Exemplary non-transient memory includes random access memory, read only memory, flash memory, or the like. Such non-transient memory can be electrically based or magnetically based. Further, the messages described herein may be generated by the components and result in various physical transformations.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In accordance with the present disclosure, circuitry could be analog and/or digital, components, or one or more suitably programmed microprocessors and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software.

As discussed above, current systems do not have the ability to auto-tune the wavelength of tunable laser technology for wave-division multiplexing systems. The present disclosure addresses these deficiencies with a methodology for automatically tuning tunable lasers in WDM systems, so that the tunable lasers may transmit and receive optical signals at the WDM channel (wavelength) that matches the filter port on the WDM filter to which they are connected.

Wavelength-division multiplexing (WDM) is a type of optical multiplexing in which two or more optical carrier signals, such as Optical Channel (OCh) signals, are multiplexed onto a single optical fiber by using different wavelengths (that is, colors) of laser light. WDM may be used to increase bandwidth over existing fiber networks by combining and transmitting multiple signals simultaneously at different wavelengths on the same fiber.

WDM systems may be referred to as "normal" wave-division multiplexing (WDM), "coarse" wave-division multiplexing (CWDM) and "dense" wave-division multiplexing (DWDM), depending on their different wavelength patterns. Typically, the normal WDM systems (sometimes also referred to as BWDM) use the 1310 wavelength and the 1550 wavelength on one fiber. Coarse WDM provides up to eighteen channels across multiple transmission windows of silica fibers. Dense wavelength division multiplexing (DWDM) typically uses the C-Band (1530 nm-1565 nm) transmission window, but with denser channel spacing. For example, a DWDM system may use forty channels at 100 GHz spacing or eighty channels with 50 GHz spacing, though DWDM systems may vary in number of channels and/or spacing. Some technologies are capable of 12.5 GHz spacing (sometimes called ultra dense WDM). The wavelengths may include the L-band (1565 nm-1625 nm), which allows for a greater number of channels.

DWDM puts data together on an optical fiber, with each signal carried at the same time on its own separate light wavelength. Using DWDM, multiple separate wavelengths or channels of data can be multiplexed into a light stream transmitted on a single optical fiber, for example eighty or more separate wavelengths can be multiplexed. For example, DWDM line systems made by Infinera have the capability to transport 128 channels (wavelengths) across the extended C-band channel spectrum over thousands of kilometers (typically 4000 km).

In WDM systems, since each channel is demultiplexed at the end of the transmission back into the original source, different data formats being transmitted at different data rates can be transmitted together. For example, Internet (IP) data, SONET, and Ethernet data can all be traveling at the same time within the optical fiber.

For convenience, the discussion herein is in the context of a WDM or DWDM system. However, one of ordinary skill in the art would understand these concepts apply to protocols and different network architectures including but not limited to DWDM and CWDM, and using different wavelength bands such as C-band, L-band, O-band, S-band and E-band, as well as different embodiments of WDM filters, including but not limited to array waveguide gratings (AWG) and thin film filter technology (TFF).

Figure 1B:
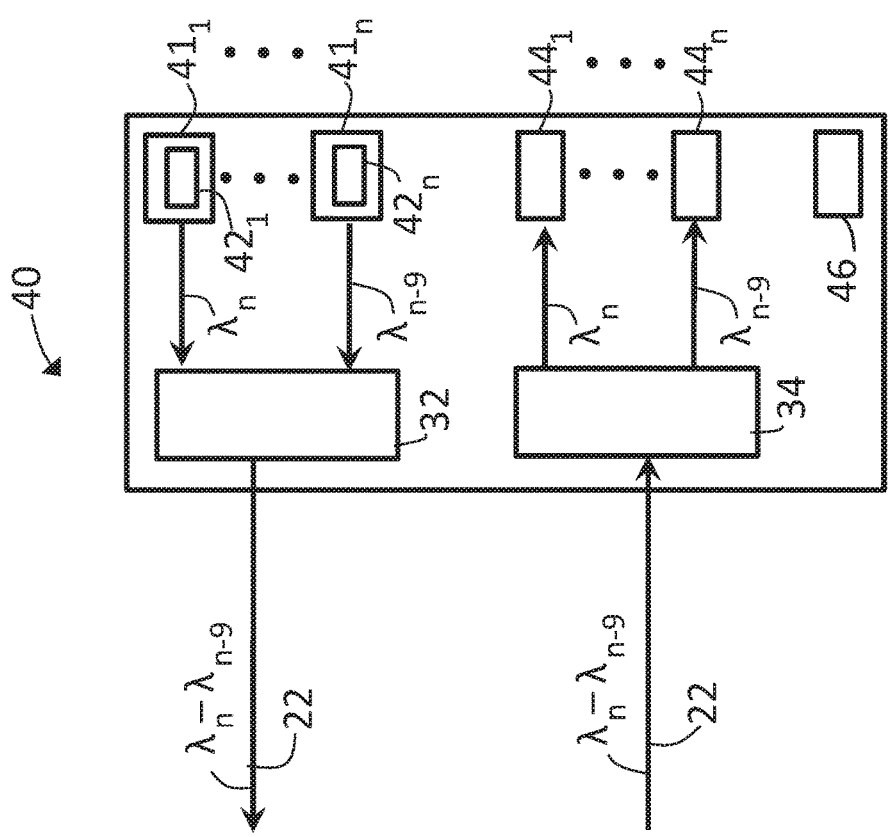
FIG. 1B is a schematic diagram of an exemplary embodiment of a node in accordance with the present disclosure.
Figure 1C:
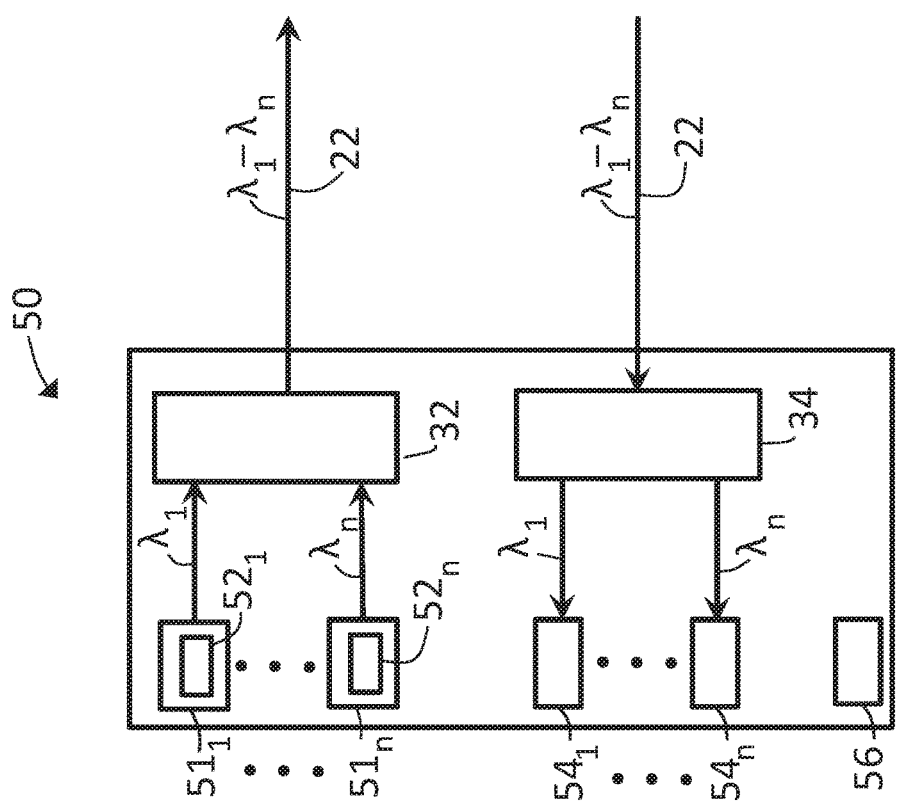
FIG. 1C is a schematic diagram of an exemplary embodiment of another node in accordance with the present disclosure.

Referring now to the drawings, and in particular to FIGS. 1A-1C, an exemplary wave-division multiplexing (WDM) system 10 is shown in a communications access network 12. WDM system 10 may be a bit-rate independent WDM system constituted between a head-end node 14 and one or more far-end node $16_1$-$16_n$ of the network 12. The head-end node 14 may be a node that is located closest to a core 18 of the network 12. The core 18 may be a central part of the access network 12 and may provide various services to one or more end users $20_1$-$20_n$ who are connected by the access network 12. The one or more far-end node $16_1$-$16_n$ may be a node that is closest to one or more access points to the system for the end user(s) $20_1$-$20_n$ and may also be referred to as a remote node. For purposes of clarity, the one or more far-end node $16_1$-$16_n$ may be discussed as a single far-end node 16 and the one or more end users $20_1$-$20_n$ may be discussed as a single end user 20 herein. The network 12 may comprise multiple optical fibers 22 connecting the head-end node 14 and the far-end node 16 through which optical signals 24 travel. The network 12 may comprise one or more non-transitory memory 26 and/or one or more processor 28.

End users $20_1$-$20_n$ may include business customers (for example, using SD-WAN-MEF), mobile backhaul/fronthaul customers, and/or residential backhaul customers (for example, FTTx/PON Triple-Play systems and/or CATV/MSO Triple-Play systems).

The WDM system 10 may have one or more wave-division multiplexer (WDM) filter 30. The one or more WDM filter 30 may be, or be part of, one or more multiplexer 32, one or more demultiplexer 34, and/or one or more component having both a multiplexer 32 and a demultiplexer 34. Non-exclusive examples of WDM filters 30 include Athermal Arrayed-waveguide Grating (AWG) wavelength multi/demultiplexers, Thin-Film Filter (TFF) technology multiplexers, and Wavelength Selective Switches (WSS).

The one or more WDM filter 30 may be located between the head-end node 14 and the far-end node 16. In one embodiment, the WDM filter 30 may have a plurality of ports 36. One or more of the ports 36, or each port 36, may be configured such that a particular port 36 is configured to a particular bandwidth, such that a particular port 36 may transmit (or allow to pass through) optical signals 24, 24a through the WDM filter 30 if the optical signals 24, 24a detected in the particular port 36 have wavelengths ($\lambda$) that are within the particular bandwidth. The particular port 36 of the WDM filter 30 may suppress the optical signals 24, 24a if the optical signals 24, 24a detected in the port 36 are not within the particular bandwidth.

In one embodiment, the one or more WDM filter 30 may suppress (that is, not allow to pass through or transmit) wavelengths $\lambda$ of optical signals 24 traveling on all other channels except for one channel. The WDM filter 30 may be structured to allow only wavelengths $\lambda$ of optical signals 24 traveling on a predetermined channel to pass through the WDM filter 30 from one node to another node. That is, the WDM filter 30 may be configured to suppress optical signals with wavelengths $\lambda$ outside of a predetermined wavelength $\lambda$ or range of wavelengths $\lambda$.

In one embodiment, each connection between the head-end node 14 and the far-end node 16 is through the WDM system 10 and the one or more WDM filter 30 such that the one or more WDM filter 30 ensures that communication can only take place on one specific WDM channel.

For example, as illustrated in FIG. 1A, in one embodiment the WDM filter 30 may be structured with one or more ports 36 to detect and pass through the WDM filter 30 optical signals 24, 24a with certain wavelengths $\lambda_1$-$\lambda_{10}$ between the head-end node 14 and the far-end node $16_1$. The WDM filter 30 may be further structured with one or more ports 36 to detect and pass through the WDM filter 30 optical signals 24, 24a with other wavelengths $\lambda n$ or ranges of wavelengths $\lambda_n$-$\lambda_{n-9}$ from other far-end nodes $16_n$.

As illustrated in FIG. 1B, the far-end node 16 may comprise one or more first transceiver 40. The first transceiver 40 may have one or more first transmitters $41_1$-$41_n$ which may comprise one or more first tunable lasers $42_1$-$42_n$ configured to transmit optical signals 24. The first transceiver 40 may have one or more first receivers $44_1$-$44_n$ configured to detect optical signals 24a. The first transceiver 40 may have one or more non-transitory memory 46. For purposes of clarity, the first transmitters $41_1$-$41_n$, the first tunable lasers $42_1$-$42_n$, and the first receivers $44_1$-$44_n$ may be described in the singular as a first transmitter 41, a first tunable laser 42, and a first receiver 44, herein.

As illustrated in FIG. 1C, the head-end node 14 may comprise one or more second transceiver 50. The second transceiver 50 may have one or more second transmitters $51_1$-$51_n$ which may comprise one or more second tunable lasers $52_1$-$52_n$ configured to transmit optical signals 24a. The second transceiver 50 may have one or more second receivers $54_1$-$54_n$ configured to detect optical signals 24. The second transceiver 50 may have one or more non-transitory memory 56. For purposes of clarity, the second transmitters $51_1$-$51_n$, the second tunable lasers $52_1$-$52_n$, and the second receivers $54_1$-$54_n$ may be described in the singular as a second transmitter 51, a second tunable laser 52, and a second receiver 54, herein.

Figure 1D:
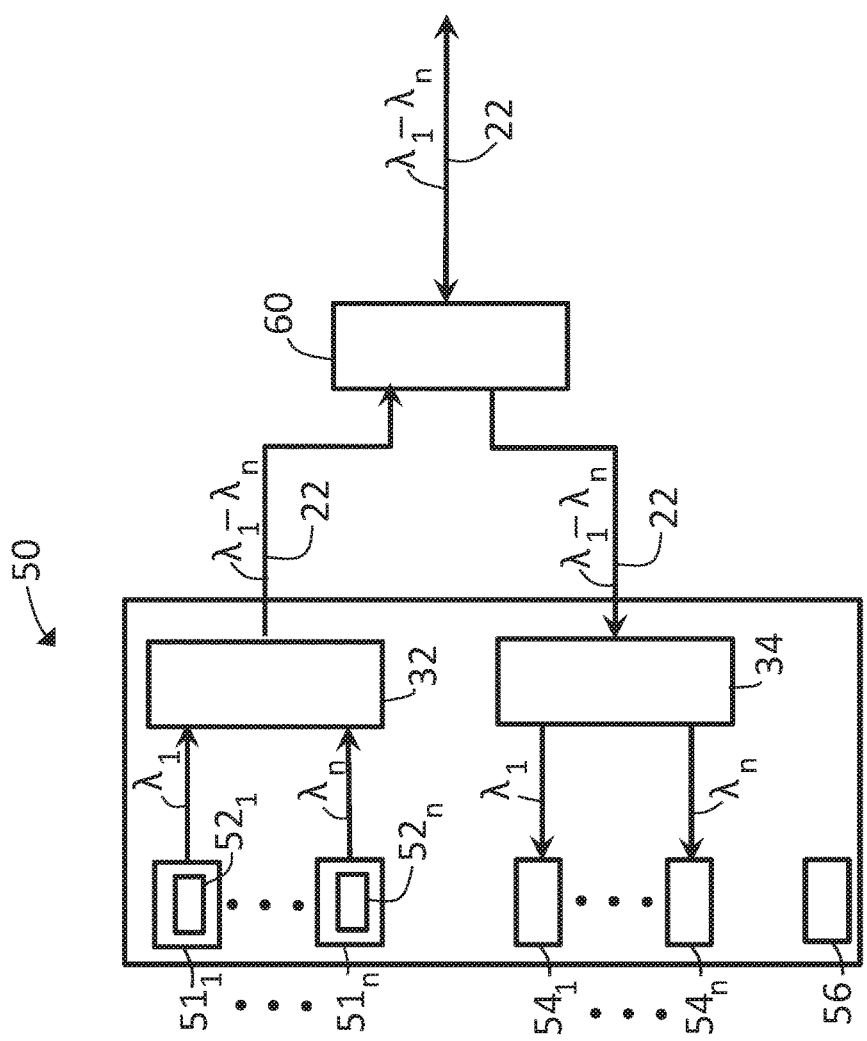
FIG. 1D is a schematic diagram of exemplary components of one embodiment of a network in accordance with the present disclosure.

In one embodiment, as illustrated in FIG. 1D, the access network 12 may be a bi-directional network.

In one embodiment, the first and/or second transceiver 40, 50 may be pluggable or hard-wired in the head-end node 14 and/or far-end node 16. Additionally or alternately, the head-end and far-end nodes 14, 16 may contain circuitry 58, such as one or more circuit board. Software may reside on the circuitry 58 of the head-end and/or far-end nodes 14, 16 and/or within the first and/or second transceiver 40, 50.

The first tunable laser 42 may be adjusted, or "tuned," to transmit optical signals 24 at different wavelengths. The second tunable laser 52 may each be adjusted, or "tuned," to transmit optical signals 24a at different wavelengths.

Figure 2:
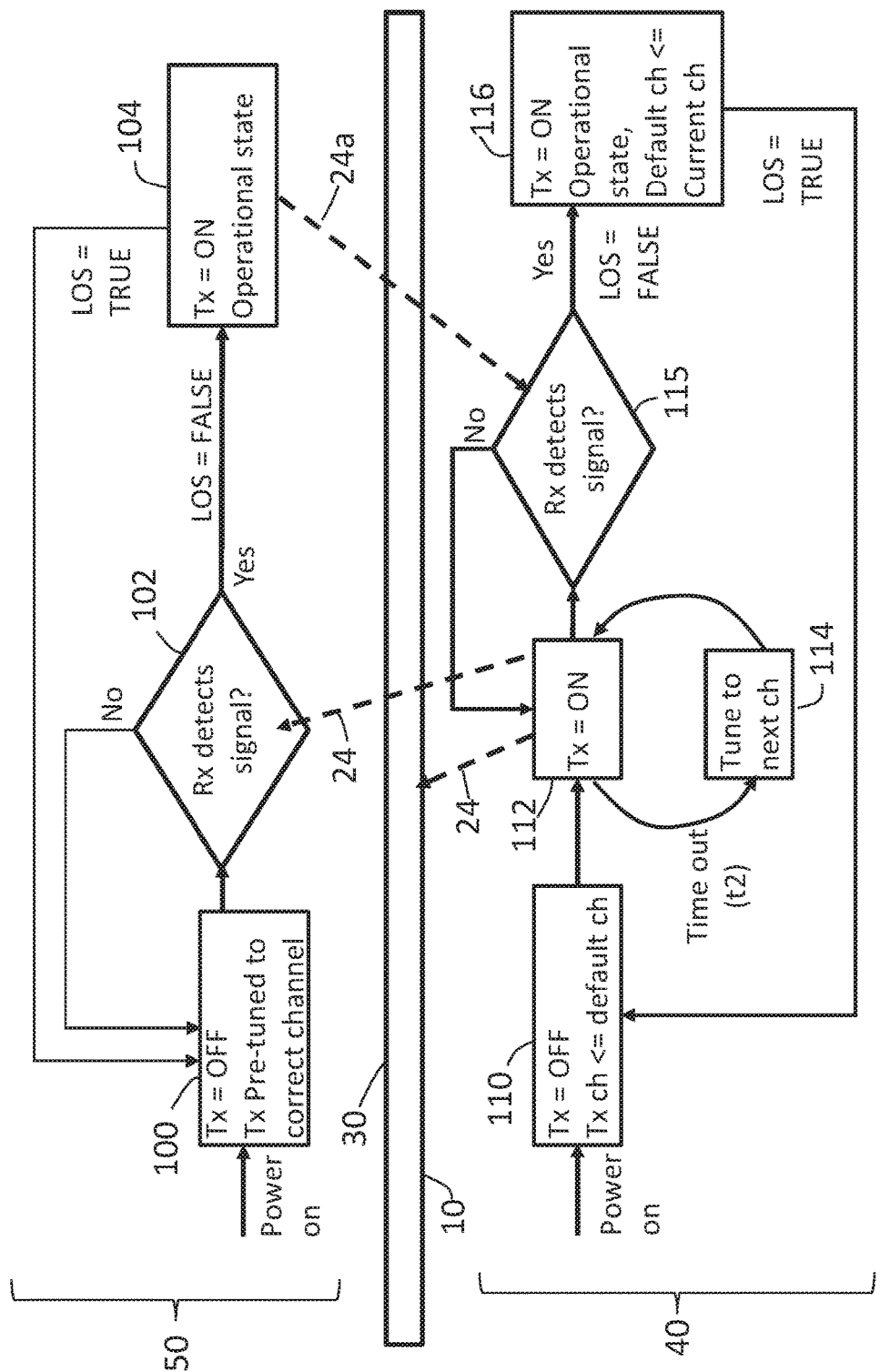
FIG. 2 is a state diagram of an exemplary embodiment of components of a system in accordance with the present disclosure.
Figure 3:
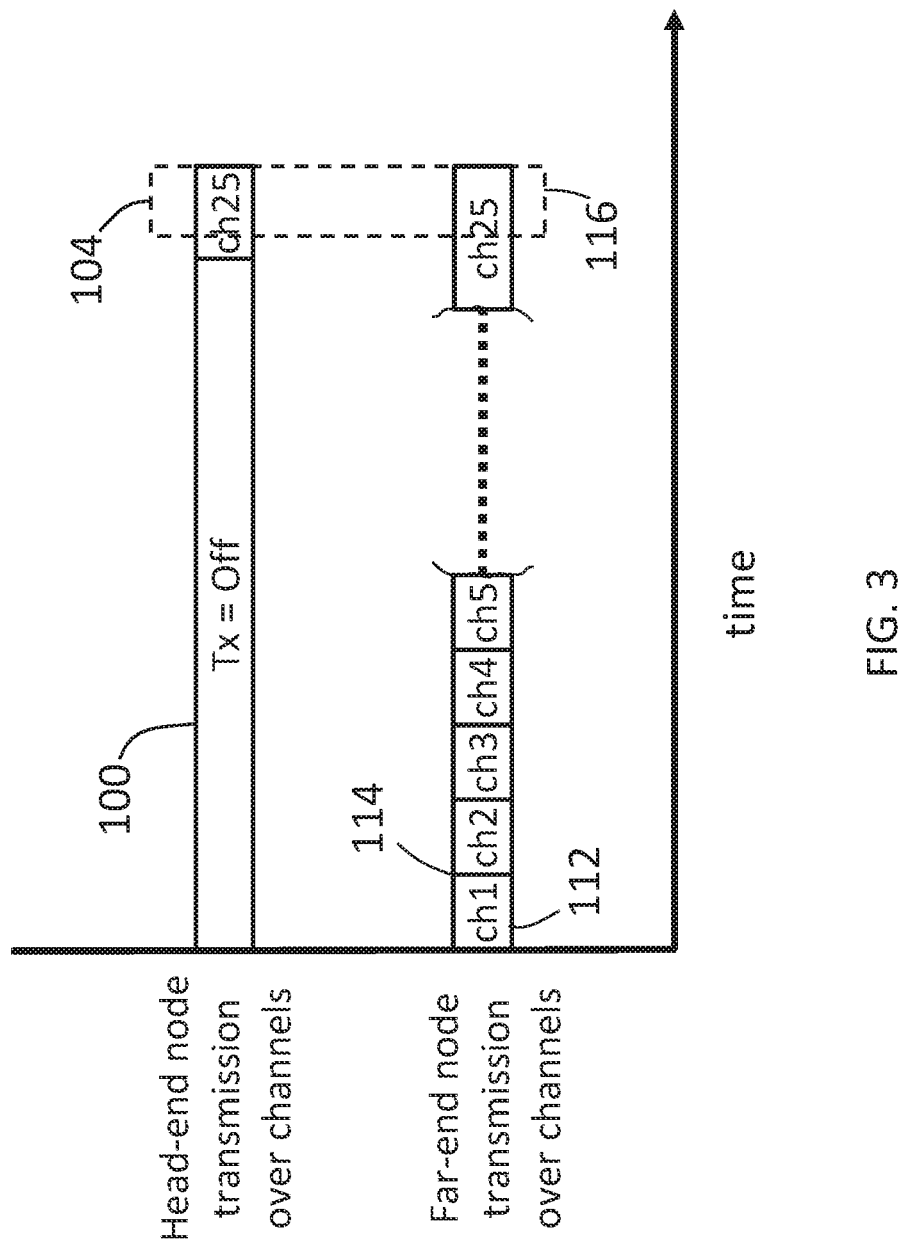
FIG. 3 is a timing diagram of an exemplary embodiment of components of a system in accordance with the present disclosure.

FIG. 2 illustrates an exemplary state diagram that describes the behavior of the first and second transceivers 40, 50 of the far-end node 16 and the head-end node 14, respectively, in accordance with one embodiment of the present disclosure. In one embodiment, the second tunable laser 52 of the second transceiver 50 of the head-end node 14 may be pre-tuned such that the second transmitter 51 may transmit optical signals 24a at a specific pre-determined and pre-set wavelength on a pre-determined and pre-set channel upon activation. In one embodiment, the second transmitter 51 may comprise a pre-set laser which is configured such that the second transmitter 51 may transmit optical signals 24a with a predetermined wavelength, which may be used instead of, or in addition to, the second tunable laser 52.

In one embodiment, when the second transceiver 50 of the head-end node 14 is activated, the second transmitter 51 is off (that is, not transmitting optical signals 24, 24a, which may be abbreviated herein as Tx=OFF) and is pre-tuned to transmit optical signals 24a in the correct channel (that is, with the correct wavelength), as reflected in step 100 of FIG. 2. If the second transceiver 50 detects a loss of signal (that is, the signal is not detected by the transceiver, which may be abbreviated herein as LOS, or LOS=True), the second transmitter 51 is turned off, that is, ceases to transmit optical signals 24a, as shown in steps 100 and 102. If the second transceiver 50 detects there is not a loss of signal (which may be abbreviated herein as LOS=FALSE), the second transmitter 51 is on (which may be abbreviated herein as Tx=ON), that is, the second transmitter 51 may transmit optical signals 24a, and the second transmitter 51 may be in its operational state, as shown in step 104.

As shown in FIG. 2, in one embodiment, the first tunable laser 42 of the first transceiver 40 of the far-end node 16 may be tuned such that the first transmitter 41 may transmit optical signals 24 at a wavelength on a channel that matches the wavelength in the particular bandwidth that the particular port 36 of the WDM filter 30 is structured to allow to pass through the WDM filter 30.

The first transceiver 40 may receive a feedback response from the head-end node 14 which the first transceiver 40 of the far-end node 16 may utilize to decide whether the first transceiver 40 is transmitting on the right channel (that is, the channel that matches the wavelength in the particular bandwidth that the particular port 36 of the WDM filter 30 is structured to allow to pass through the WDM filter 30 to the head-end node 14). In one embodiment, the feedback response may comprise a transmitted optical signal 24a from the second tunable laser 52 of the second transmitter 51 of the second transceiver 50 of the head-end node 14 transmitted towards the far-end node 16.

In one embodiment, the optical signal 24a from the second tunable laser 52 of the second transmitter 51 of the second transceiver 50 may be a confirmation signal. In one embodiment, the confirmation signal may be indicative of operational information regarding the WDM system 10 and/or the access network 12. In one embodiment, the optical signal 24a from the second tunable laser 52 of the second transmitter 51 of the second transceiver 50 may be an optical signal carrying data as the beginning of operational transmissions and receipts between the head-end node 14 and the far-end node 16.

In one embodiment, the head-end node 14 may not transmit optical signals 24a until the head-end node 14 detects one or more optical signal 24 from the far-end node 16.

As illustrated in FIGS. 1E, 1F, 2, and 3, in one embodiment, the first tunable laser 42 of the first transceiver 40 of the far-end node 16 may transmit an optical signal 24 over a plurality of channels (i.e. at different wavelengths) in a sequence, and detect with the first receiver 42 a response from the second tunable laser 52 of the second transmitter 51 of the second transceiver 50 of the head-end node 14, when the first tunable laser 42 transmits the optical signal 24 at the correct channel. The "correct" channel is the channel which is not suppressed by the WDM filter 30, that is, the optical signal 24, 24a having the specified wavelength $\lambda_1$ in the particular bandwidth $BW_1$ that the particular port 36 of the WDM filter 30 is configured allowed to pass through the WDM filter 30.

In one embodiment, the first transceiver 40 may begin the process of auto-tuning at a different time than the second transceiver 50 may begin the transmission of optical signals 24a. The first transceiver 40 and the second transceiver 50 may each be unaware of the other and may be powered-on at different times. In one embodiment, the first transceiver 40 may begin transmission of the one or more optical signals 24 in order to determine the correct channel for transmission and detection of optical signals 24, 24a through the WDM filter 30 to the second transceiver 50, before the second transceiver 50 begins transmission of optical signals 24a.

In one embodiment, when the first transceiver 40 of the far-end node 16 is activated, the first transmitter 41 is off (i.e., not transmitting optical signals 24). The first tunable laser 42 may be pre-tuned to transmit optical signals 24 with a first wavelength on a first channel, as reflected in step 110 of FIG. 2. As shown in step 112, the first transmitter 41 may transmit an optical signal 24 having the first wavelength on the first channel. The first transceiver 40 may monitor the first receiver 44 for detection of a returning optical signal 24a from the head-end node 14 indicating that the optical signal 24 transmitted on the first channel was detected. The first transceiver 40 may monitor the first receiver 44 for a predetermined amount of time (t2).

Figure 1E:
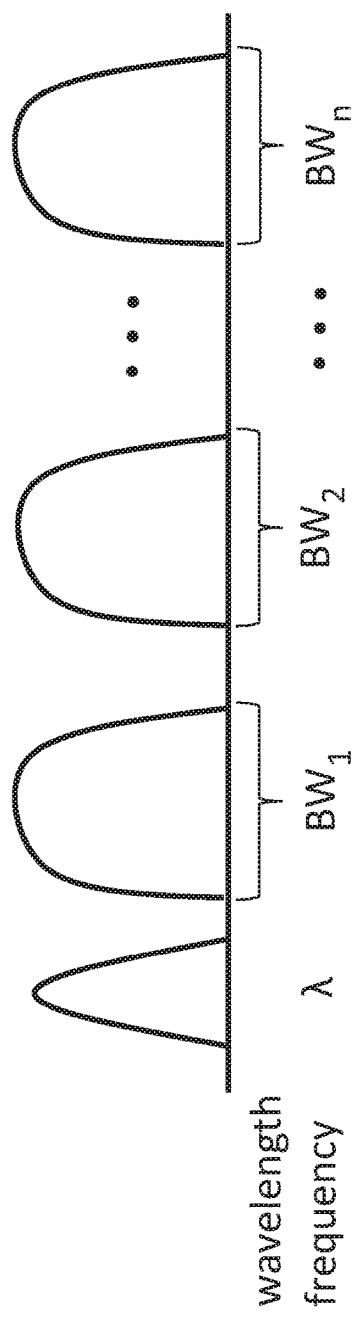
FIG. 1E is a schematic diagram of an exemplary wavelength before tuning according to one embodiment of the present disclosure.
Figure 1F:
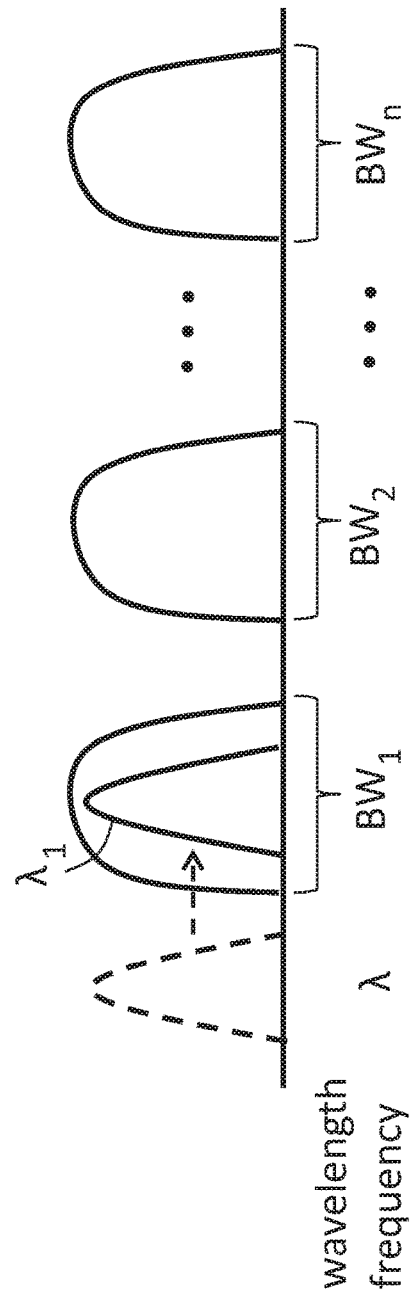
FIG. 1F is a schematic diagram of an exemplary wavelength after tuning according to one embodiment of the present disclosure.

If no returning optical signal 24a from the head-end node 14 is detected by the receiver 44 of the first transceiver 40 of the far-end node 16, the first transceiver 40 may automatically tune the first tunable laser 42 to configure the first tunable laser 42 such that the first transmitter 41 may transmit the optical signal 24 having a second wavelength on a second channel, as shown in step 114 of FIG. 2, and as illustrated in FIGS. 1E and 1F. The first transmitter 41 may transmit the optical signal 24 having the second wavelength on the second channel and may monitor the first receiver 44 for detection of a returning optical signal 24a from the head-end node 14 indicating that the optical signal 24 transmitted on the second channel was detected by the head-end node 14, as shown in steps 112 and 115. The first transceiver 40 may monitor the first receiver 44 for a predetermined amount of time (t2).

In one embodiment, the predetermined amount of time is set based on user expectance for wait times in optical communication systems. In one embodiment, the predetermined amount of time is sixty seconds or less. However, it will be understood that the predetermined amount of time could be other amounts of time.

If the first transceiver 40 detects the returning optical signal 24a from the head-end node 14, then the transmission-monitoring-tuning-transmission sequence (steps 112, 114, and 115) stops. The first transceiver 40 of the far-end node 16 is then in its operational state where the default channel is the current channel (which may be abbreviated herein as "Default ch←Current ch") in which the first receiver 44 detected the returning optical signal 24a from the head-end node 14, as shown in step 116 of FIG. 2. The first transceiver 40 of the far-end node 16 and the second transceiver 50 of the head-end node 14 are then synchronized to communicate on the same channel. It will be understood that the channel may be used for communication from the head-end node 14 to the far-end node 16 and/or communication from the far-end node 16 to the head-end node 14. However, a different channel may be used for communication from the head-end node 14 to the far-end node 16 than the channel used for communication from the far-end node 16 to the head-end node 14.

In one embodiment, if the first transceiver 40 detects a loss of signal (LOS=TRUE), the process may return to step 110 and/or 112 and/or the first transceiver 40 may return to transmitting one or more optical signal 24 on the last channel that was used.

By way of example, in use in one embodiment the first transmitter 41 of the first transceiver 40 of the far-end node 16 may transmit a first optical signal 24 having a first wavelength A on a first channel, over the optical fiber 22 in the WDM network 10. The first transceiver 40 may monitor the first receiver 44 of the first transceiver 40 for detection of a returning optical signal 24a indicative of the first optical signal 24 being detected by the second receiver 54 of the second transceiver 50 of the head-end node 14. In one embodiment, the first transceiver 40 may monitor the first receiver 44 for a predetermined amount of time.

If the first optical signal 24 is not transmitted having a wavelength in the particular bandwidth that the particular port of the WDM filter 30 is configured to pass through the WDM filter 30, the WDM filter 30 suppresses the first optical signal 24. Therefore, the first optical signal 24 will not reach the head-end node 14, and the head-end node 14 will not transmit the optical signal(s) 24a to the far-end node 16.

Responsive to the first optical signal 24 not being detected by the head-end node 14, the first transceiver 40 may automatically "tune" the first tunable laser 42 to configure the first tunable laser 42 such that the first transmitter may transmit a second optical signal 24 having a second wavelength on a second channel, as illustrated in FIGS. 1E and 1F.

Responsive to the first optical signal 24 not being detected by the head-end node 14, the first transmitter 41 of the first transceiver 40 of the far-end node 16 may transmit a second optical signal 24 having a second wavelength on a second channel, over the optical fiber 22 in the WDM network 10.

In one embodiment, the first transceiver 40 may transmit the second optical signal 24 after monitoring the first receiver 44 for a predetermined amount of time for detection of the optical signal 24a from the head-end node 14 indicative of the first optical signal 24 being detected by the second receiver 54 of the transceiver 50 of the head-end node 14.

If the second optical signal 24 from the far-end node 16 is transmitted having a wavelength $\lambda_1$ in the particular bandwidth BM that the particular port 36 of the WDM filter 30 is configured to allow too pass through the WDM filter 30, the second optical signal 24 may be detected by the second receiver 54 of the second transceiver 50 of head-end node 14.

In response, the head-end node 14 may transmit an indication that the second optical signal 24 was detected by the head-end node 14 to the far-end node 16. In one embodiment, the head-end node 14 may transmit, with the second tunable laser 52 of the second transceiver 50 of the head-end node 14, an optical signal 24a on the second channel, which may be interpreted by the far-end node 16 as a confirmation of detection by the head-end node 14 of the second optical signal 24 on the second channel.

The first transceiver 40 of the far-end node 16 may monitor the first receiver 44 for detection of an indication that the second optical signal 24 was detected by the head-end node 14, such as the optical signal 24a on the second channel indicative of the confirmation of detection by the head-end node 14 of the second optical signal 24 on the second channel. In one embodiment, the first transceiver 40 may monitor the first receiver 44 for a predetermined amount of time.

When the first receiver 44 of the first transceiver 40 of the far-end node 16 receives the indication that the second optical signal 24 was detected by the head-end node 14, such as the returning optical signal 24a on the second channel indicative of a confirmation of detection by the head-end node 14 of the second optical signal 24 on the second channel, the first transceiver 40 may be in an operational state and the tuning of the first tunable laser 42 may be complete. At that point, the far-end node 16 and the head-end node 14 are synchronized to the same channel, and the first transceiver 40 of the far-end node 16 may monitor the first receiver 44 for detection of one or more additional and/or continuing optical signals 24a on the second channel from the head-end node 14.

However, if the second optical signal 24 is not transmitted having a wavelength in the particular bandwidth that the particular port 36 of the WDM filter 30 is configured to pass through the WDM filter 30, the WDM filter 30 suppresses the second optical signal 24, and the second optical signal 24 will not reach the head-end node 14. Responsive to the second optical signal 24 not being detected by the head-end node 14, the first transceiver 40 of the far-end node 16 may automatically tune the first tunable laser 42 to be configured such that the first transmitter 41 may transmit a third optical signal 24 having a third wavelength on a third channel. The first transmitter 41 of the first transceiver 40 of the far-end node 16 may then transmit the third optical signal 24 having a third wavelength on a third channel having a third range of wavelengths, over the optical fiber 22 in the WDM network 10.

In one embodiment, the first transceiver 40 may transmit the third optical signal 24 after monitoring the first receiver 44 for a predetermined amount of time for detection of a returning optical signal 24a indicative of the second optical signal 24 being detected by the second receiver 54 of the transceiver 50 of the head-end node 14.

The first transceiver 40 of the far-end node 16 may repeat the steps of tuning the first tunable laser 42 to be configured to transmit another optical signal 24 having another wavelength on another channel, transmitting such optical signal 24, and monitoring the first receiver 44 for confirmation of detection of the optical signal 24 by the head-end node 14, until the first transceiver 40 receives confirmation that the optical signal 24 was detected by the head-end node 14 from the far-end node 16. In one embodiment, the confirmation is in the form of an optical signal 24a transmitted from the head-end node 14 to the first transceiver 40. In one embodiment, monitoring the first receiver 44 for confirmation of detection of the optical signal 24 by the head-end node 14 may be monitoring the first receiver 44 for confirmation of detection of the optical signal 24 by the head-end node 14 for a predetermined amount of time.

In one embodiment, the first transceiver 40 of the far-end node 16 and the second transceiver 50 of the head-end node 14 may be connected via a single optical fiber 22 (also known as single strand) and may use bi-directional communication through a single one of the optical fiber 22, as illustrated in FIG. 1D. In a typical bi-directional communication on a single optical fiber, one wavelength is used for the uplink and another wavelength is used for the downlink. The wavelengths may be close to each other or far apart in wavelength, depending on transmission requirements and filter architecture. For all practical purposes, the optical fiber 22 can be regarded as a linear, passive transmission medium, meaning that the two channels (and wavelengths) will not interfere with each other. The access network 12 in a bi-directional system may include one or more coupler 60 that may couple the wavelengths to the single optical fiber 22. It should be appreciated by a person skilled in the art that the systems and methods described herein are also applicable for bi-directional communication. In a bi-directional embodiment, where communication is typically established on different wavelengths, one transmitted by the first transceiver 40 and one by the second transceiver 50, the one or more WDM filters 30 will transmit the correct wavelengths and suppress other wavelengths as previously described. The one or more WDM filters 30 ensure that the wavelengths are correctly transmitted and reach the first and/or second receivers 44, 54.

Figure 4:
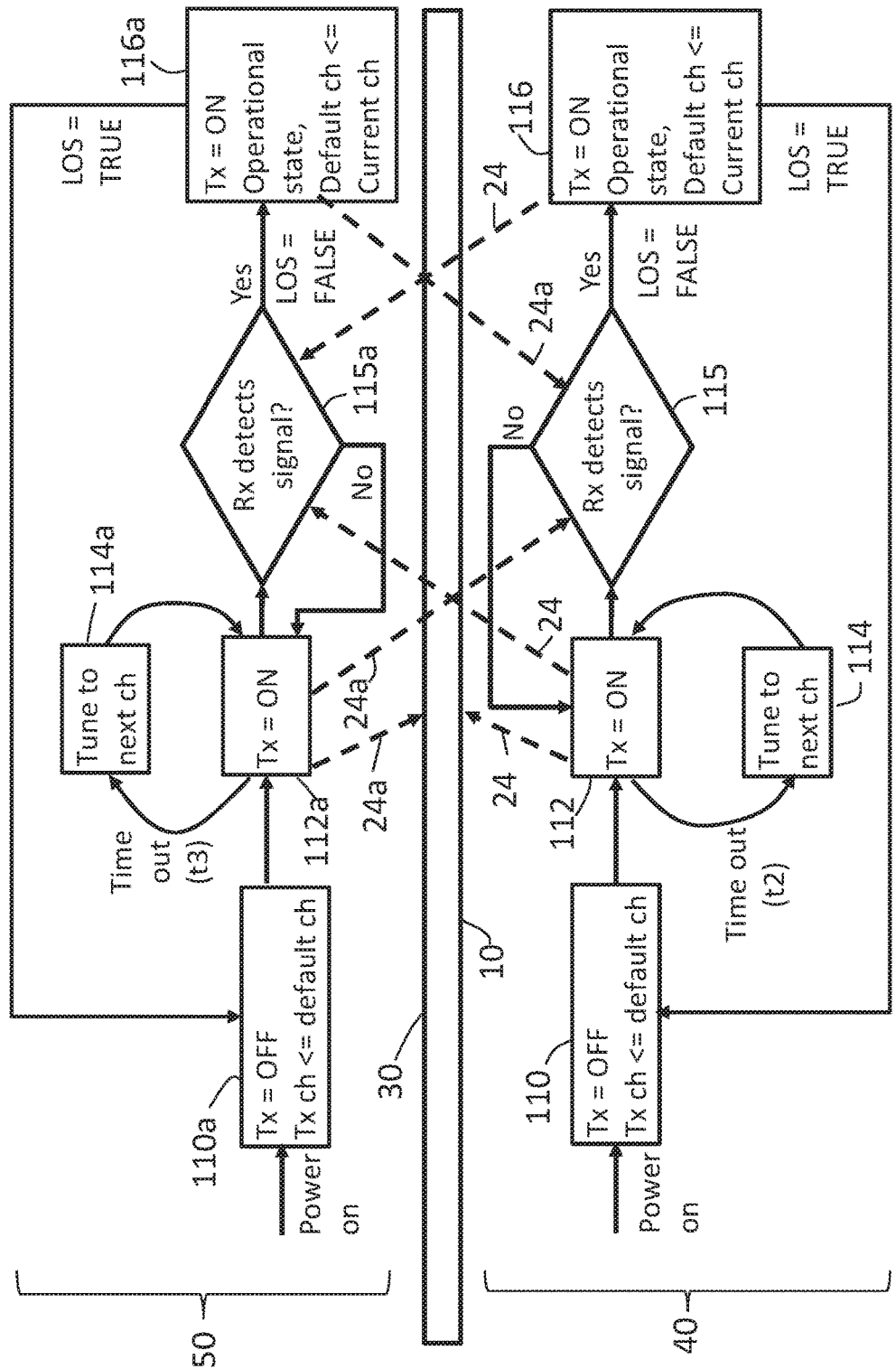
FIG. 4 is a state diagram of an exemplary embodiment of components of a system in accordance with the present disclosure.
Figure 5:
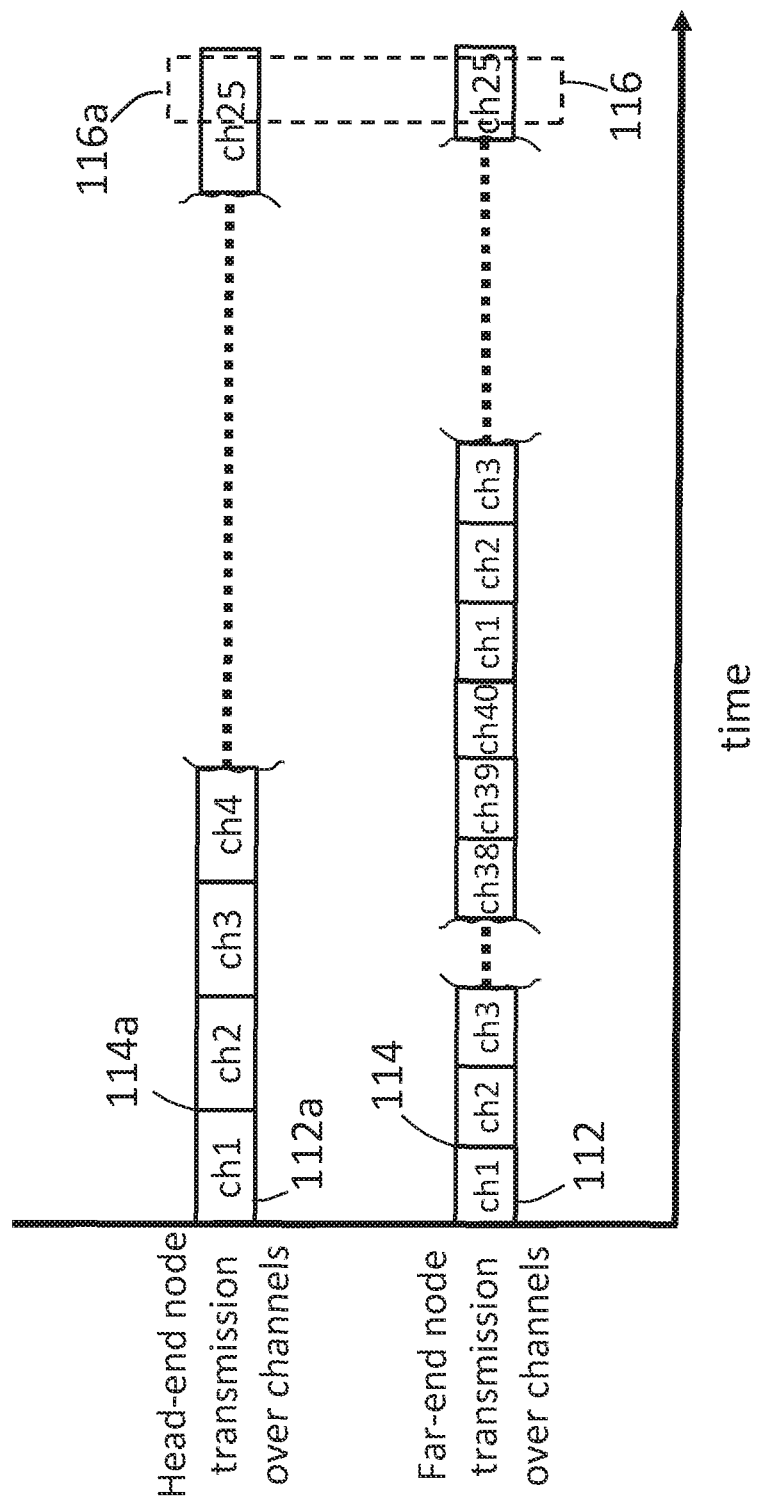
FIG. 5 is a timing diagram of an exemplary embodiment of components of a system in accordance with the present disclosure.

Referring now to FIGS. 4 and 5, in one embodiment, the second transceiver 50 may be configured to automatically tune the second tunable laser 52 as well as the first transceiver 40 being configured to automatically tune the first tunable laser 42 to synchronize the first transceiver 40 with the second transceiver 50. This may be referred to as dual-sided tuning.

In one embodiment, the first transceiver 40 may begin the process of auto-tuning at a different time than the second transceiver 50 may begin the process of auto-tuning.

In one embodiment of dual-sided tuning, the second tunable laser 52 may be pre-tuned to transmit optical signals 24a on a first channel, as reflected in step 110a of FIG. 4. As shown in step 112a, the second transmitter 51 may transmit an optical signal 24a having a first wavelength on the first channel. The second transceiver 50 may monitor the second receiver 54 for a returning optical signal 24 from the far-end node 16 that the second transceiver 50 would interpret as indicating that the optical signal 24a from the head-end node 14 was detected by the far-end node 16. The returning optical signal 24 may be a confirmation signal. The second transceiver 50 may monitor the second receiver 54 for a first predetermined amount of time (t3).

If no returning optical signal 24 from the far-end node 16 is detected, the second transceiver 50 may automatically tune the second tunable laser 52 such that the second transmitter 51 may transmit an optical signal 24a having a second wavelength on a second channel, as shown in step 114a of FIG. 4. The second transmitter 51 may transmit the optical signal 24a having the second wavelength on the second channel and may monitor the second receiver 54 for a returning optical signal 24 from the far-end node 16 indicating that the optical signal 24a was detected by the far-end node 16, as shown in step 112a and 115a of FIG. 4. The second transceiver 50 may monitor the second receiver 54 for the first predetermined amount of time (t3).

If the second transceiver 50 detects the returning optical signal 24 from the far-end node 16, then the transmission-monitoring-tuning-transmission sequence (steps 112a, 114a, and 115a) stops. The second transceiver 50 of the head-end node 14 is then in its operational state where the default channel is the current channel in which the second receiver 54 received the returning optical signal 24 from the far-end node 16 and in which the second tunable laser 52 will transmit optical signals 24a, as shown in step 116a of FIG. 4. In one embodiment, if the second transceiver 50 detects a loss of signal (LOS=TRUE), the process may return to step 110a and/or 112a and/or the second transceiver 50 may return to transmitting one or more optical signal 24a on the last channel that was used.

As shown in FIGS. 4 and 5, the far-end node 16 may also follow the auto-tuning process, as previously described in relation to FIG. 2. The head-end node 14 and the far-end node 16 may simultaneously auto-tune the first and second tunable lasers 42, 52. Or the head-end node 14 and the far-end node 16 may begin the auto-tune process of the first and second tunable lasers 42, 52 at different times.

Additionally, in one embodiment, the first transceiver 40 may monitor the first receiver 44 for a second predetermined amount of time (t2) for detection of a confirmation signal indicative of the first optical signal 24 being detected by the second receiver 54 of the second transceiver 50 of the head-end node 14. In one embodiment, the predetermined amount of time (t3) for monitoring by the second transceiver 50 of the head-end node 14 may be different than the second predetermined amount of time (t2) for monitoring by the first transceiver 40 of the far-end node 16. This prevents the first and second transceivers 40, 50 from changing the wavelength of their optical signals 24 at the same time so that the first and second transceivers 40, 50 are not continually out of synchronization.

In one embodiment, the far-end node 16 and the head-end node 14 may transmit one or more signals 140, 140a having information regarding the timing of detected optical signals 24, 24a, which may be referred to as timing messages 150, 152. Practical implementations of methods sending such timing messages 150, 152 may include, without limitations, in-band, out-of-band signaling, and/or specific modulation of the tunable laser 42, 52. The inclusion of timing messages 150, 152 allows a faster connectivity in the case of dual-sided tuning.

Figure 6B:
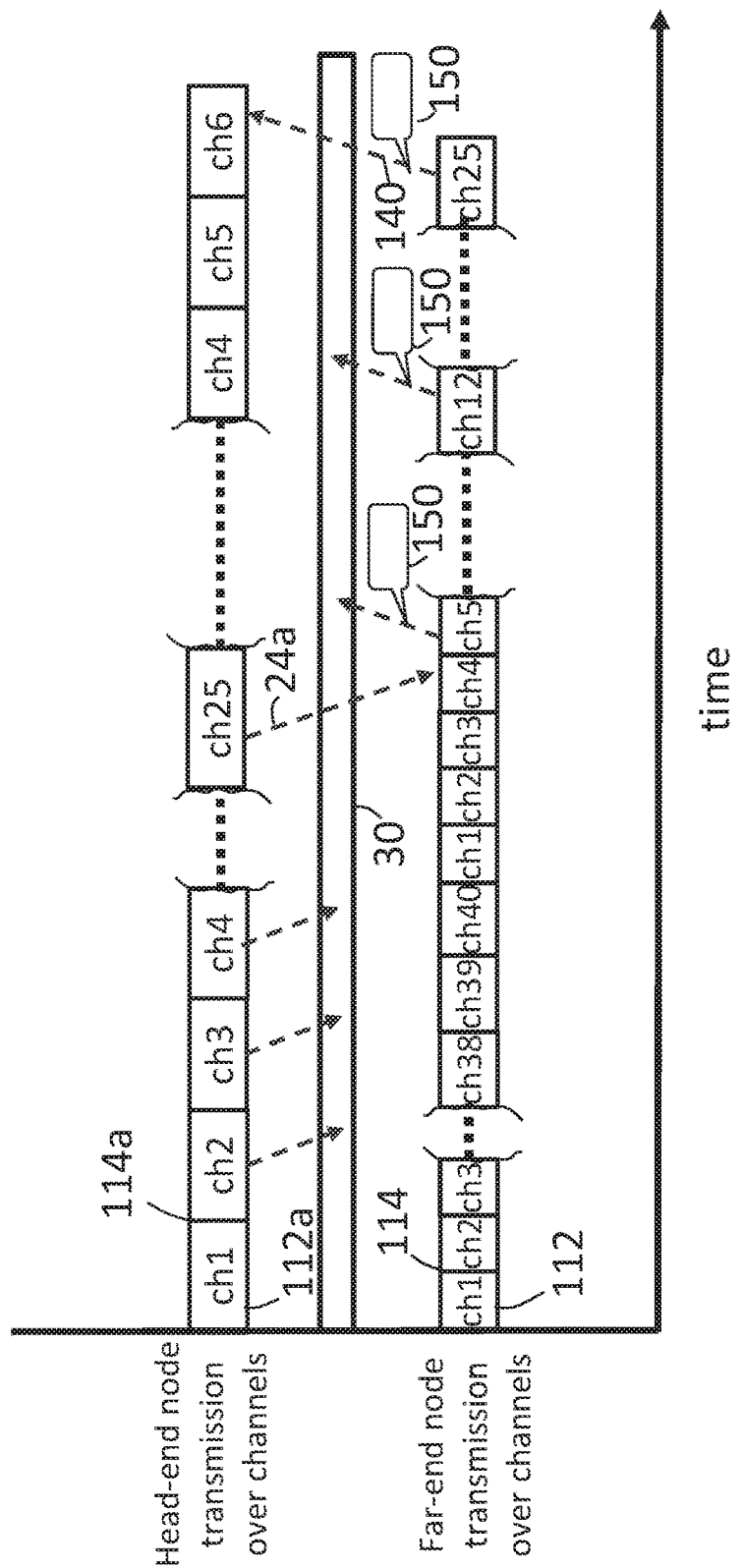
FIG. 6B is another timing diagram of an exemplary embodiment of components of a system in accordance with the present disclosure.

FIGS. 6A-6D illustrate one example of such use of timing messages, showing the timing of and transmissions of the head-end node 14 over channels and the far-end node 16 over channels. In FIG. 6A the transceiver 50 of the head-end node 14 is turned on ("Tx=ON") and starts to tune the second tunable laser 52 earlier than the transceiver 40 of the far-end node 16. The transceiver 40 of the far-end node 16 may tune the first tunable laser 42 independently. In this example the correct channel is channel number twenty-five (ch25), that is, wavelengths transmitted on all other channels are suppressed by the WDM filter 30. The last event in FIG. 6A shows an optical signal 24a detected by the first receiver 44 of the far-end node 16 from the head-end node 14.

As illustrated in FIG. 6B, once the far-end node 16 detects the optical signal 24a, the far-end node 16 may start to transmit timing messages 150 providing information about the time stamp for the received optical signal 24a. These timing messages 150 may include information about absolute time, relative time, or simply refer to the channel count from the last successfully received optical signal 24a.

The last event in FIG. 6B shows a signal 140 received by the head-end node 14 from the far-end node 16, including the timing message 150. At the time of the receipt of the signal 140, the head-end node 14 may be at a different channel, which is illustrated as channel six (ch6) in FIG. 6B. The timing message 150 received by the head-end node 14 contains the information needed for the head-end node 14 to tune the second tunable laser 52 to channel twenty-five (ch25).

Figure 6C:
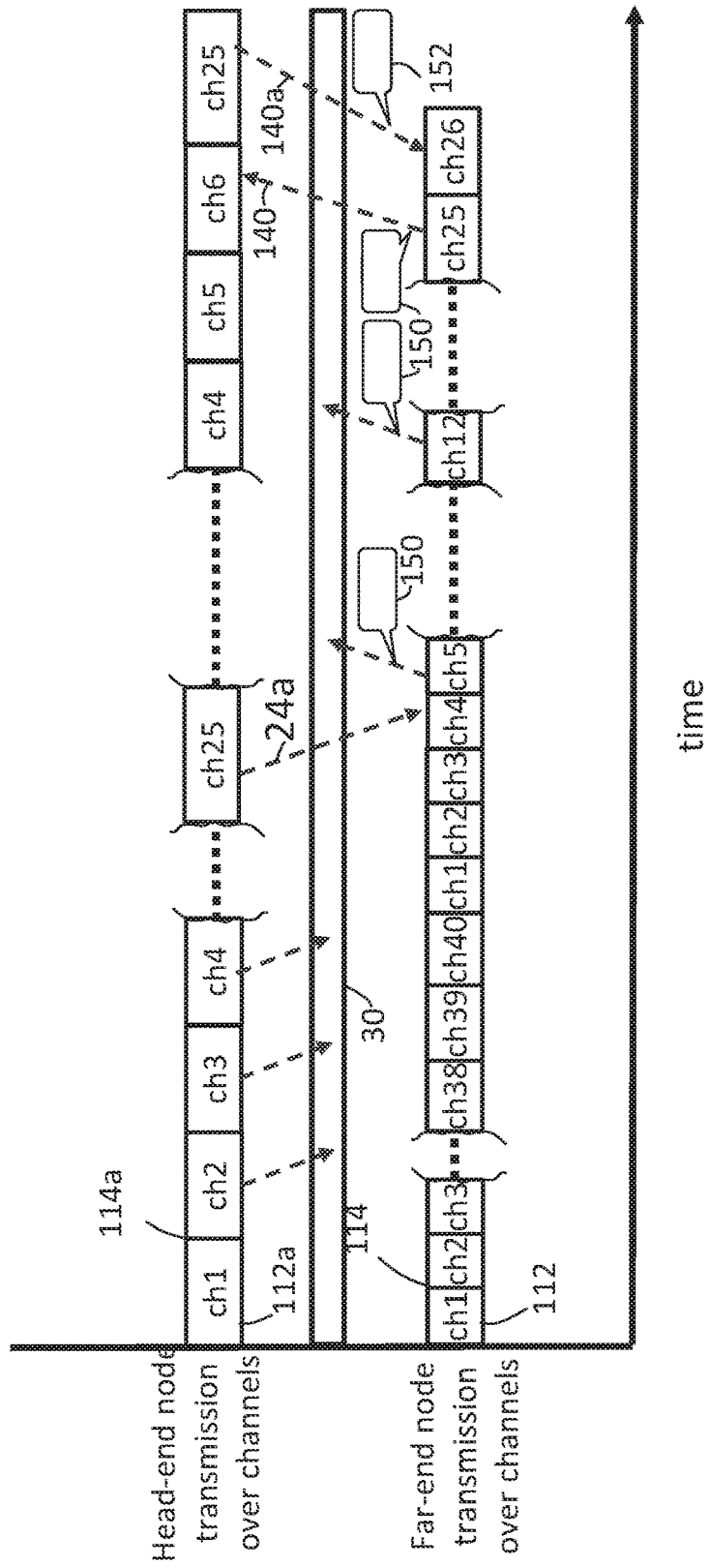
FIG. 6C is another timing diagram of an exemplary embodiment of components of a system in accordance with the present disclosure.

As illustrated in FIG. 6C, the head-end node 14 may then consequently start to transmit a signal 140a including corresponding timing messages 152 to the far-end node 16.

Figure 6D:
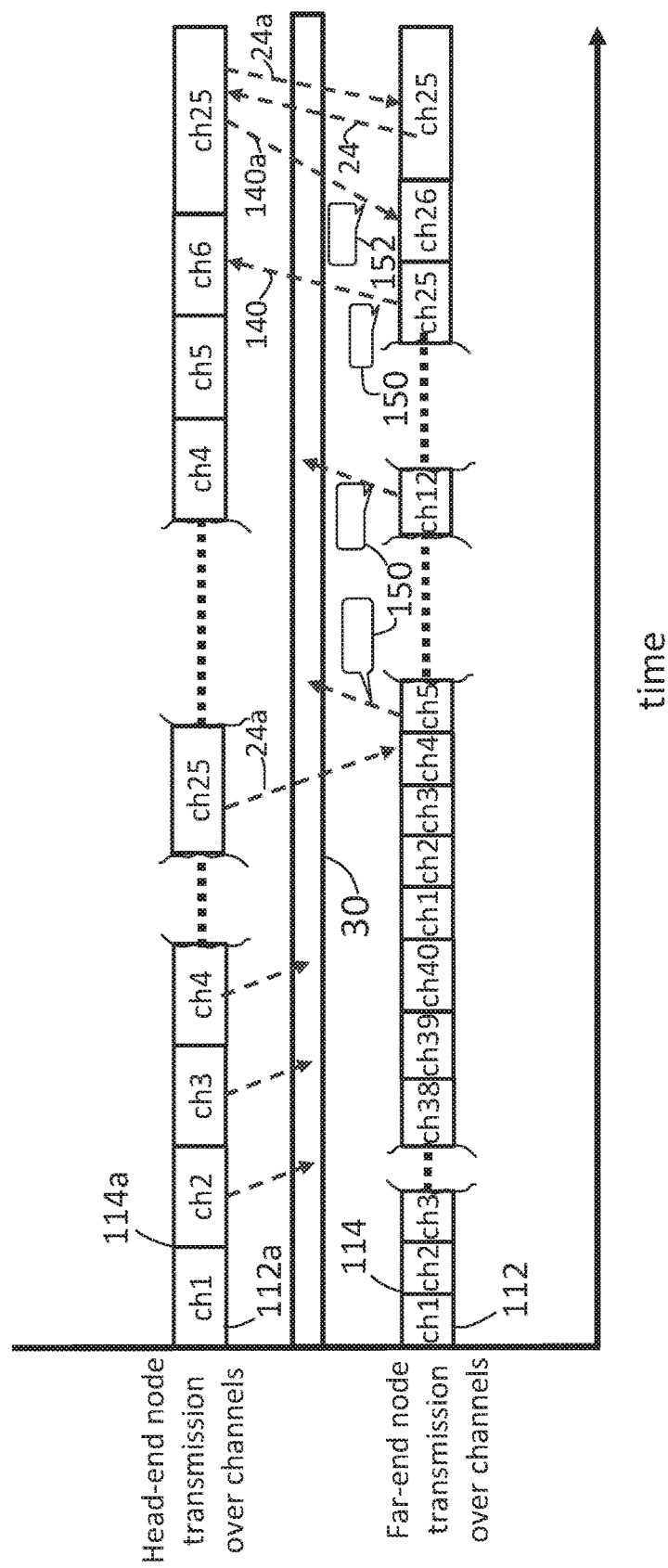
FIG. 6D is another timing diagram of an exemplary embodiment of components of a system in accordance with the present disclosure.

As illustrated in FIG. 6D, by the time the far-end node 16 receives the signal 140a having the timing messages 152, the first transceiver 40 may have already tuned the first tunable laser 42 to a different wavelength, such as channel twenty-six (ch26), for example. Therefore, after the far-end node 16 receives the timing message 152, the first transceiver 40 tunes the first tunable laser 42 to transmit optical signals 24 having wavelengths consistent with channel twenty-five (ch25). At that point, connectivity between the head-end node 14 and the far-end node 16 may be fully established and optical signals 24, 24a may be transmitted between the head-end node 14 and the far-end node 16 in normal operations on the correct channel.

In one embodiment, the output wavelength (frequency) of the optical signal 24 from the first tunable laser 42 is slightly detuned during the auto-tuning process so that it is slightly off the wavelength grid where it should finally be. When the auto-tuning process has completed, the wavelength detuning is stopped and the transmitted optical signal 24 is at the correct wavelength (frequency) grid. The wavelength detuning is small enough (typically, but not limited to, in the order a few GHz or a few tens of Gigahertz, either up or down in frequency) that the optical signal 24 is still transmitted correctly through the WDM system 10 and not suppressed by the one or more WDM filter 30.

The reason for detuning the wavelength during the auto-tuning process is to minimize the optical crosstalk penalties on any adjacent operational channel that may result from a tuning transmitter transmitting on the wrong channel (considering that the isolation of the one or more WDM filter 30 in the network may be finite and a small portion of the signal may leak through). The detuning may ensure that the optical crosstalk will not be of coherent nature and thus reduce the induced penalty.

Figure 7:
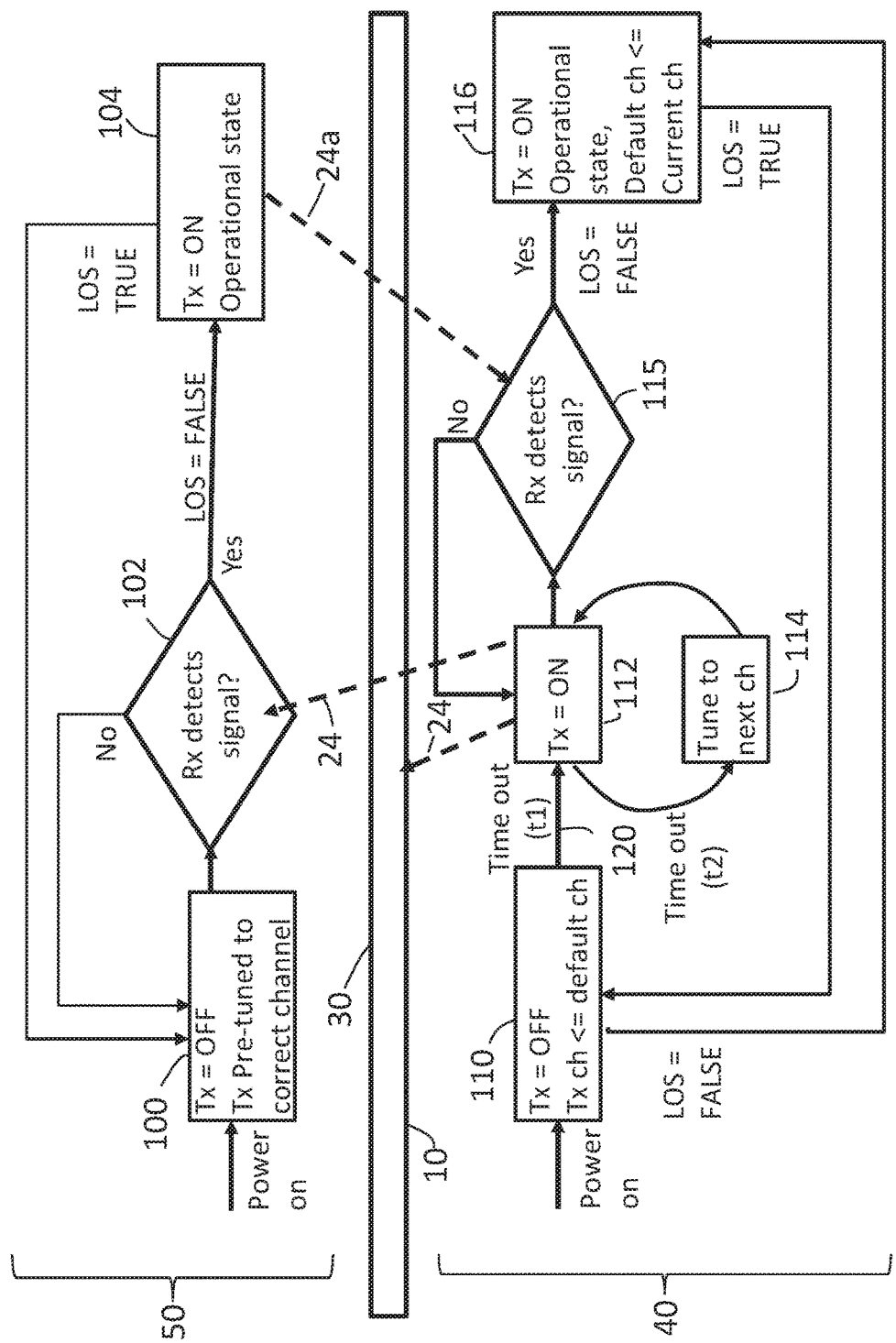
FIG. 7 is a state diagram of an exemplary embodiment of components of a system in accordance with the present disclosure.

In one embodiment, as shown in FIG. 7, when auto-tuning has completed successfully, the channel found for communication between the head-end node 14 and the far-end node 16 may be stored in the non-transitory memory 46, 56 of the first and/or second transceiver 40, 50 (and/or in non-transitory memory 26 elsewhere in the WDM system 10 or access network 12) as a default channel. When power is supplied, the first and/or second transceiver 40, 50 may tune first and/or second tunable laser 42, 52 directly to the default channel, transmit an optical signal 24, 24a, and wait for feedback indicating receipt of the optical signal 24, 24a by the head-end or far-end node 14, 16. This allows for a quick startup or recovery in case of loss of connectivity between the head-end node 14 and the far-end node 16. Non-exclusive examples of loss of connectivity may include loss of optical signal 24, 24a, loss of electrical power, loss of fiber connection in the network, change of fiber connection, and so on. Loss of optical signal 24, 24a may be defined as the state when the optical signal strength to the first receiver 44 or the second receiver 54 drops below a certain, predetermined, threshold, as is well known by persons having ordinary skill in the art.

In one embodiment, as shown in the state diagram of FIG. 7, the first transceiver 40 of the far-end node 16 may comprise a timer function 120 with a time-out value (t1) that resets the first transceiver 40 to the default channel and restarts the auto-tuning process in case there is no feedback response from the head-end node 14. This allows the first transceiver 40 of the far-end node 16 to update the default channel upon successful auto-tuning to enable a quick start-up or recovery in case of connectivity between the head-end node 14 and the far-end node 16.

For convenience, the discussion herein is in the context of WDM or DWDM systems. However, one of ordinary skill in the art would understand these concepts apply to different protocols and/or network architectures including but not limited to DWDM and CWDM, and using different wavelength bands such as C-band, L-band, O-band, S-band and E-band, as well as different embodiments of WDM filters, including but not limited to array waveguide gratings (AWG) and thin film filter technology (TFF).

Further, programming for the first and/or second transceivers 40, 50 may be implemented in the optical layer in the first and/or second transceivers 40, 50. Additionally, or alternately, programming may be implemented at the system layer and commands may be transmitted to the first and/or second transceivers 40, 50.

In one embodiment, the network 12 may be a dual-fiber network and may use a different wavelength of the optical signals 24a for transmission from the head-end node 14 to the far-end node 16 than the wavelength of the optical signals 24 for transmission from the far-end node 16 to the head-end node 14. In such a case, the first and second transceivers 40, 50 may auto-tune the first and second tunable lasers 42, 52 accordingly to transmit on different channels depending on the direction of the transmission. As a non-limiting example, the network 12 may use channel twenty-four (ch24) for transmission of the optical signals 24a from the head-end node 14 to the far-end node 16, and may use channel twenty-five (ch25) for transmission of the optical signals 24 from the far-end node 16 to the head-end node 14.

CONCLUSION

Conventionally, systems have not had the ability to auto-tune the wavelength of tunable laser technology for wavelength division multiplexing systems. The present disclosure addresses these deficiencies with methods and systems for automatically tuning tunable lasers in WDM systems, so that the tunable lasers may transmit and receive optical signals at the WDM channel (wavelength) that matches the filter port on the WDM filter to which they are connected.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are hereby incorporated herein by reference:

[G.692] ITU-T, "Optical interfaces for multichannel systems with optical amplifiers", October 1998.

[G.695] ITU-T, "Optical interfaces for coarse wavelength division multiplexing applications", January 2015.

[G.698.3] ITU-T, "Multichannel seeded DWDM applications with single-channel optical interfaces", February 2012.

[G.709-v3] ITU-T, "Interfaces for the Optical Transport Network (OTN)", December 2009.

[G.805] ITU-T, "Generic functional architecture of transport networks", March 2000.

[G.872] ITU-T, "Architecture of optical transport networks", November 2001.

[G.959.1] ITU-T, "Optical transport network physical layer interfaces", April 2016.

What is claimed is:

1. A transceiver, comprising:
    a transmitter including a tunable laser;
    a receiver; and
    a memory,
    wherein the transmitter successively transmits a first optical channel, a second optical channel, and a third optical channel, each of the first, second, and third optical channels having a respective one of a first, second, and third wavelength, such that between the transmission of the first channel and the transmission of the second channel, the receiver detects a fourth optical channel having a fourth wavelength, and between the transmission of the second channel and the third channel, the receiver detects a presence of the fourth optical channel, such that upon detection of the fourth optical channel, information indicative of one of the third optical channel is stored in the memory.

2. A transceiver in accordance with claim 1, wherein the transceiver is a first transceiver, wherein the fourth optical channel is output from a second transceiver.

3. A transceiver in accordance with claim 1, wherein the fourth optical channel is passed through an optical filter.

4. A transceiver in accordance with claim 1, wherein the transmitter transmits the first, second, and third optical channels onto an optical fiber and the receiver receives the fourth optical channel from the optical fiber.

5. A transceiver in accordance with claim 1, wherein, the transmitter transmits the second optical channel a predetermined length of time after the transmission of the first optical channel, and the transmitter transmits the third optical channel the predetermined length of time after the transmission of the second optical channel.

6. A transceiver in accordance with claim 1, wherein, based at least in part on the information stored in the memory, the transmit transmits the third optical channel after a loss of signal condition associated with the fourth optical channel.

7. A method, comprising:
  successively transmitting a first optical channel, a second optical channel, and a third optical channel, each of the first, second, and third optical channels having a respective one of a first, second, and third wavelength;
  between the transmission of the first channel and the transmission of the second channel, detecting an absence of a fourth optical channel with a receiver;
  between the transmission of the second channel and the third channel, detecting a presence of the fourth optical channel with the receiver; and
  storing in a memory information indicative of the third optical channel after said detection the presence of the fourth optical channel.

8. A method in accordance with claim 7, further including passing the fourth optical channel through an optical filter.

9. A method in accordance with claim 7, further including:
  transmitting the first, second, and third optical channels onto an optical fiber; and
  receiving the fourth optical channel from the optical fiber.

10. A method in accordance with claim 7, wherein, the second optical channel is transmitted a predetermined length of time after the transmission of the first optical channel, and the third optical channel is transmitted the predetermined length of time after the transmission of the second optical channel.

11. A method in accordance with claim 7, further including transmitting, based at least in part on the information stored in the memory, the third optical channel after a loss of signal condition associated with the fourth optical channel.

* * * * *